April 19, 1949.  J. MARTIN  2,467,763
LAUNCHING MEANS FOR AIRPLANE SEATS
Filed Jan. 3, 1946  11 Sheets-Sheet 2
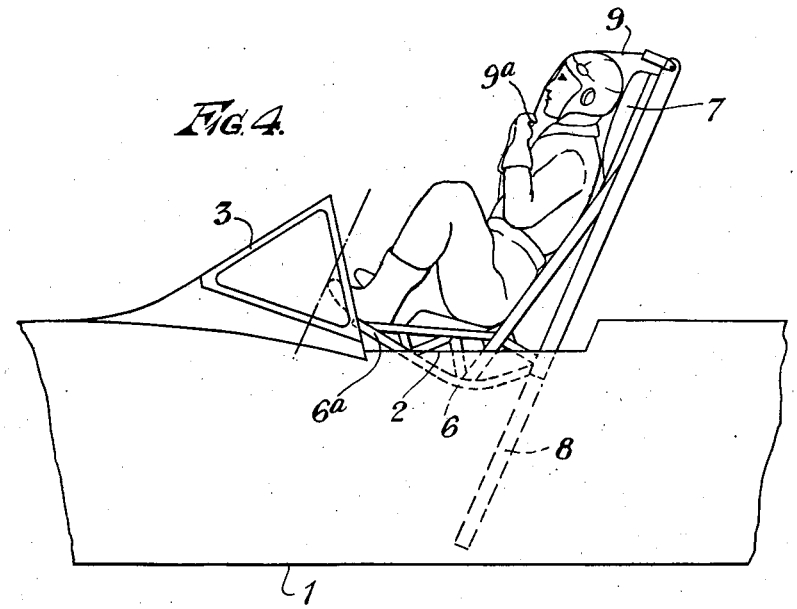
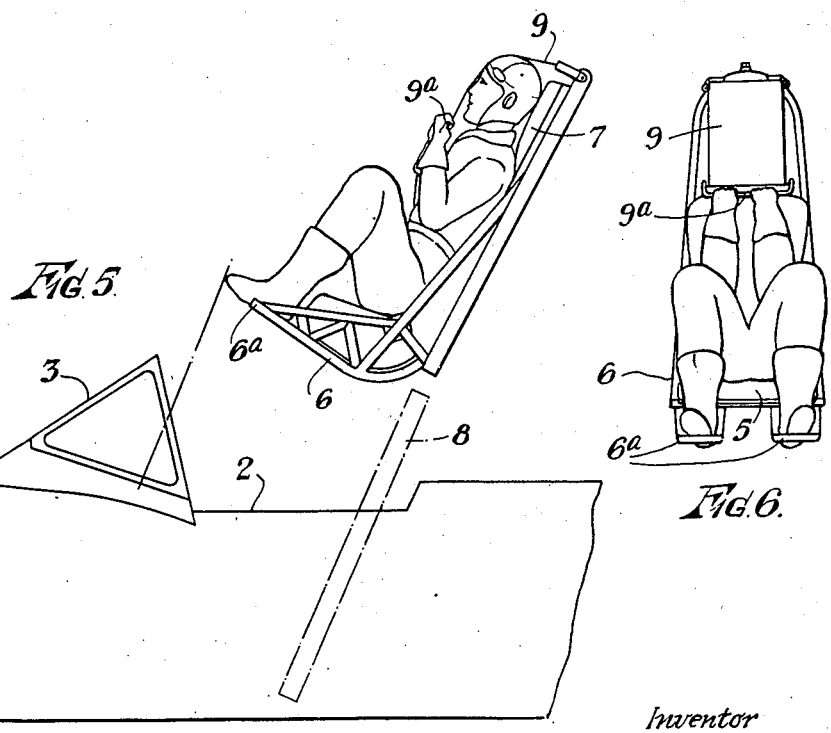
Inventor
JAMES MARTIN
per Racquer Ho
Attorney.

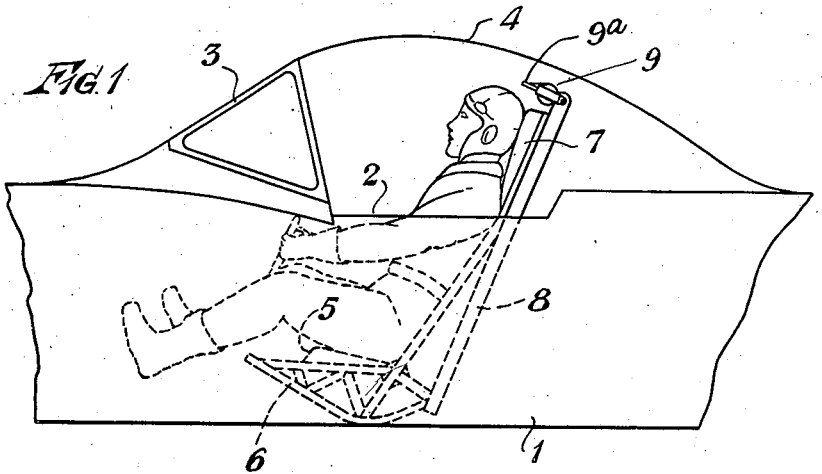
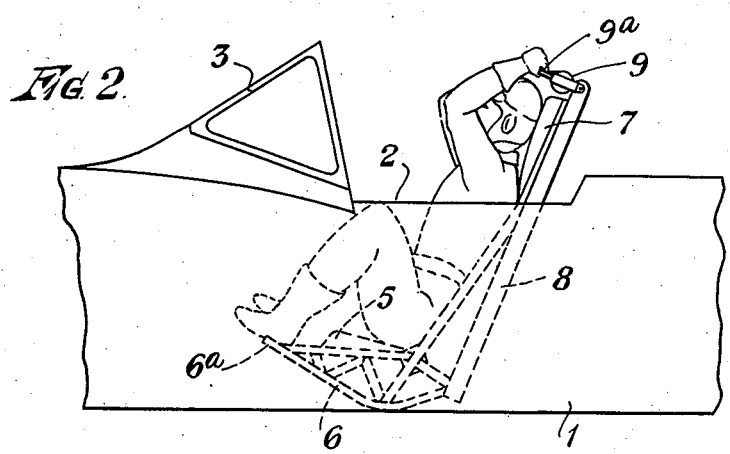
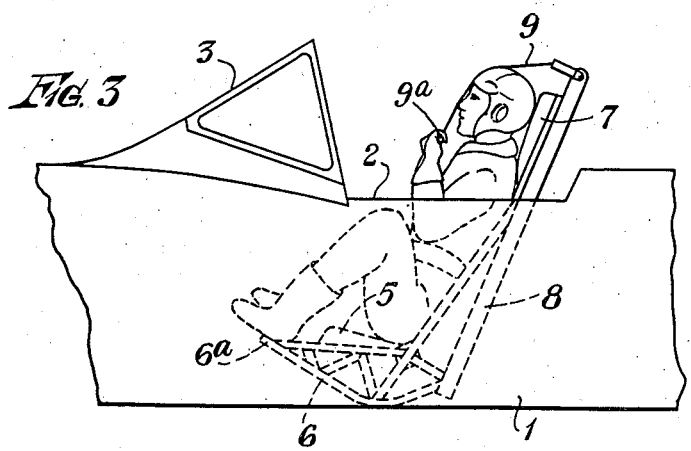

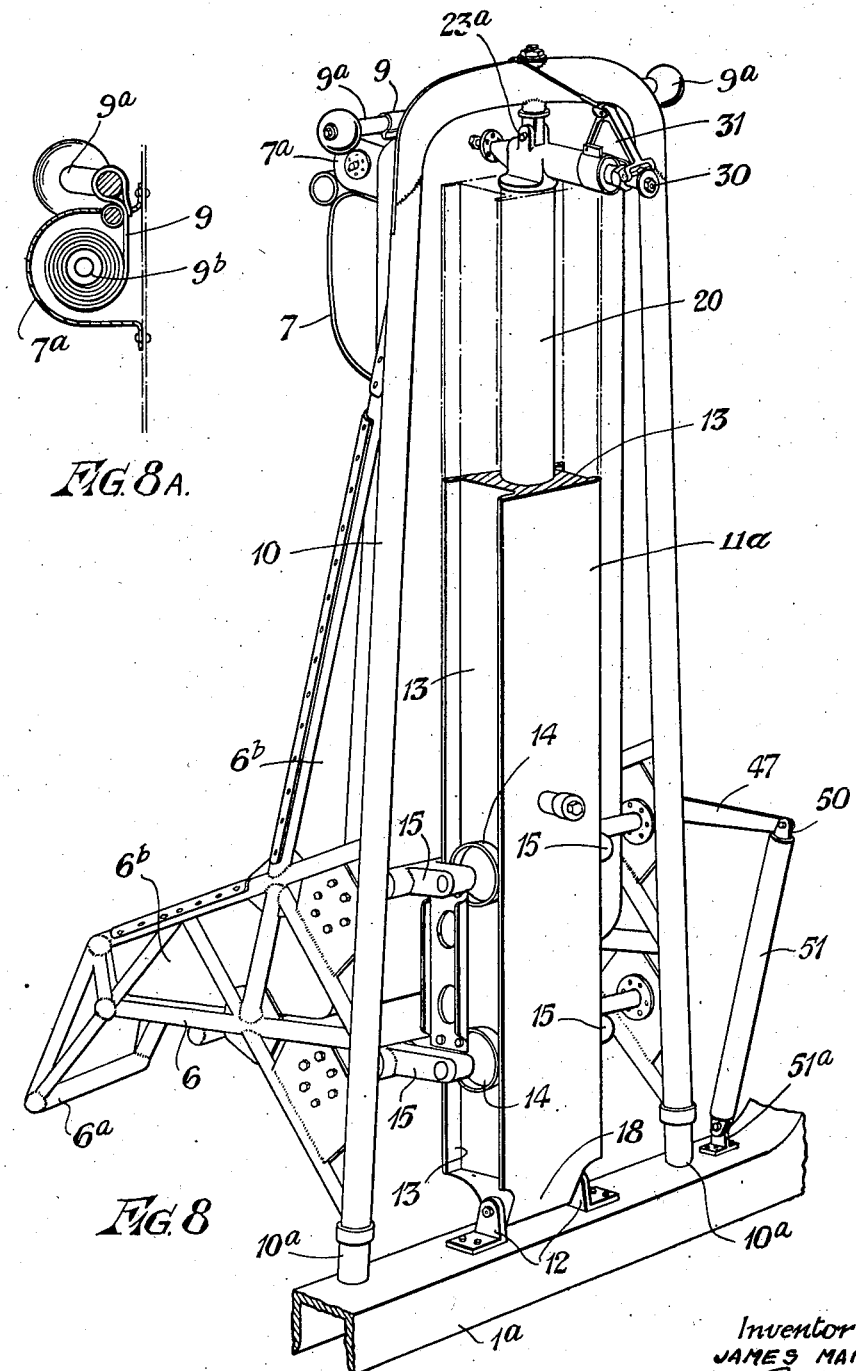

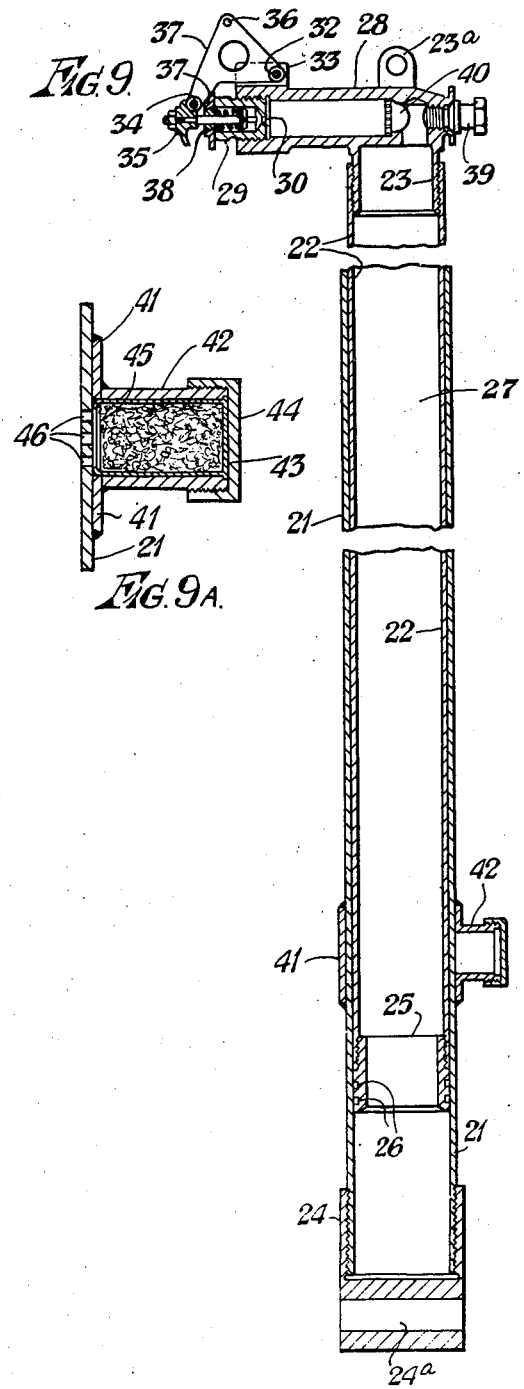

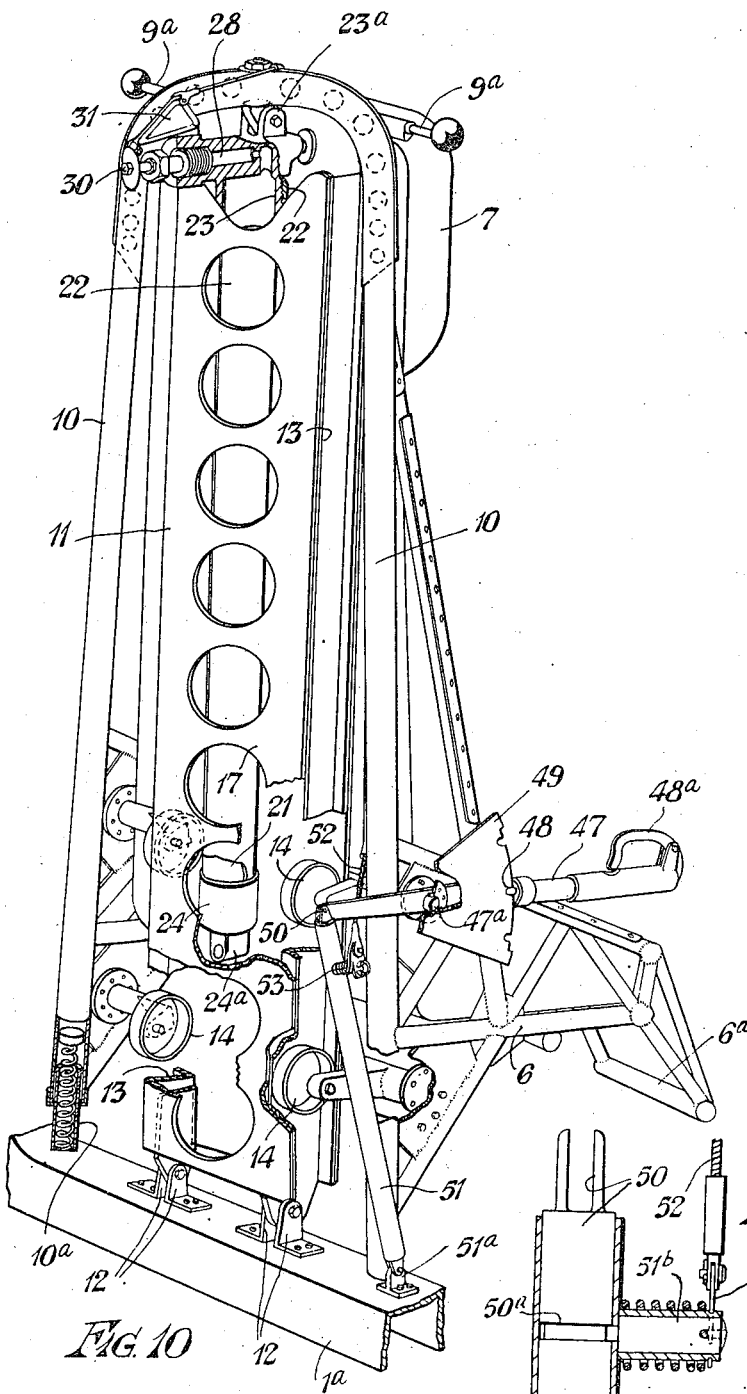

April 19, 1949. J. MARTIN 2,467,763
LAUNCHING MEANS FOR AIRPLANE SEATS
Filed Jan. 3, 1946. 11 Sheets-Sheet 7
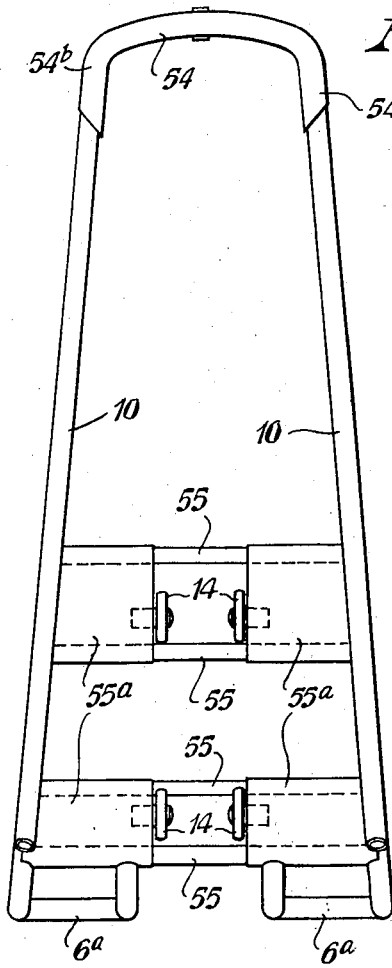
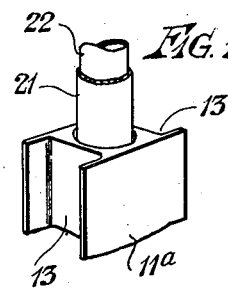
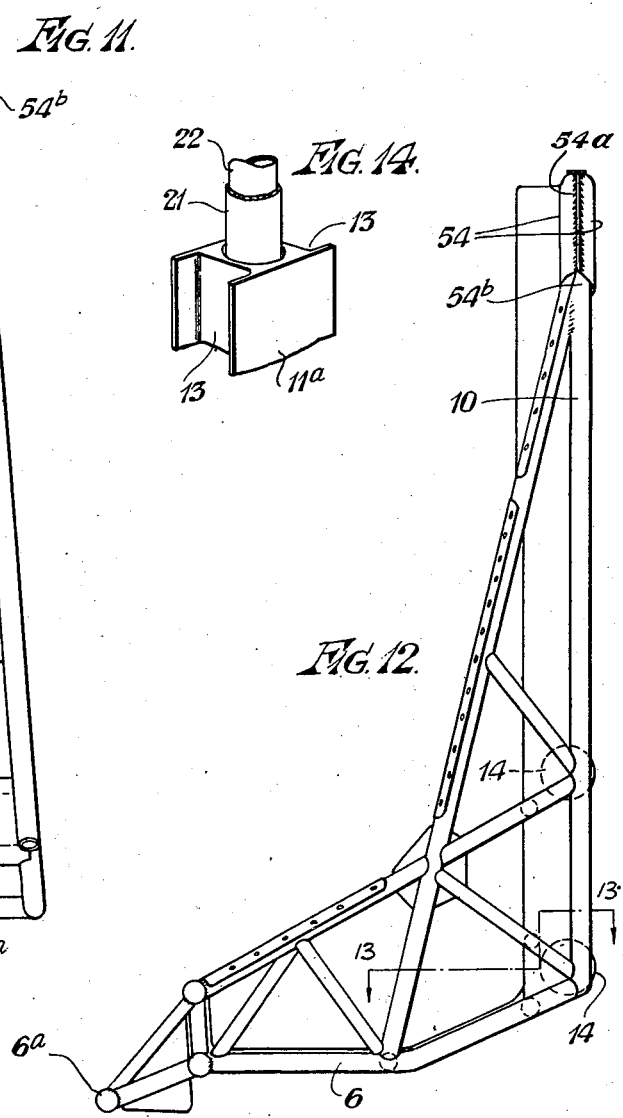
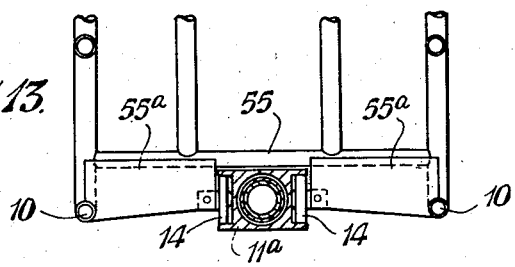
Inventor
JAMES MARTIN.
per Rayner &
Attorney.

April 19, 1949.  J. MARTIN  2,467,763
LAUNCHING MEANS FOR AIRPLANE SEATS
Filed Jan. 3, 1946  11 Sheets-Sheet 8
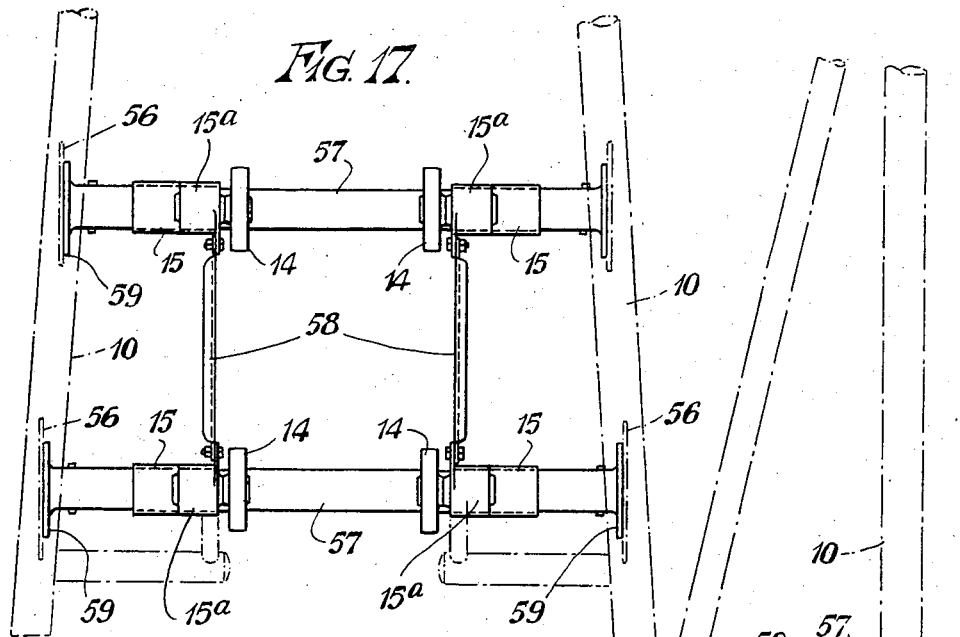
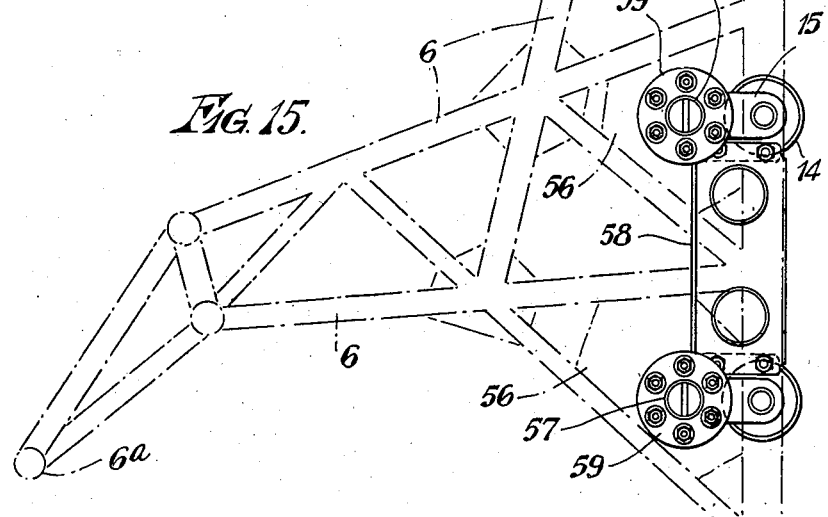
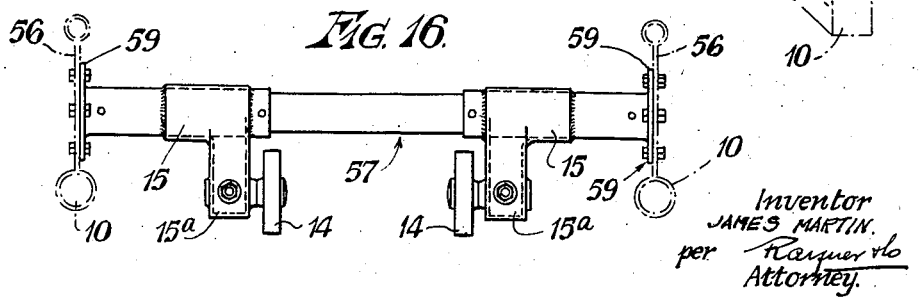
Inventor
JAMES MARTIN.
per Rayner &c
Attorney.

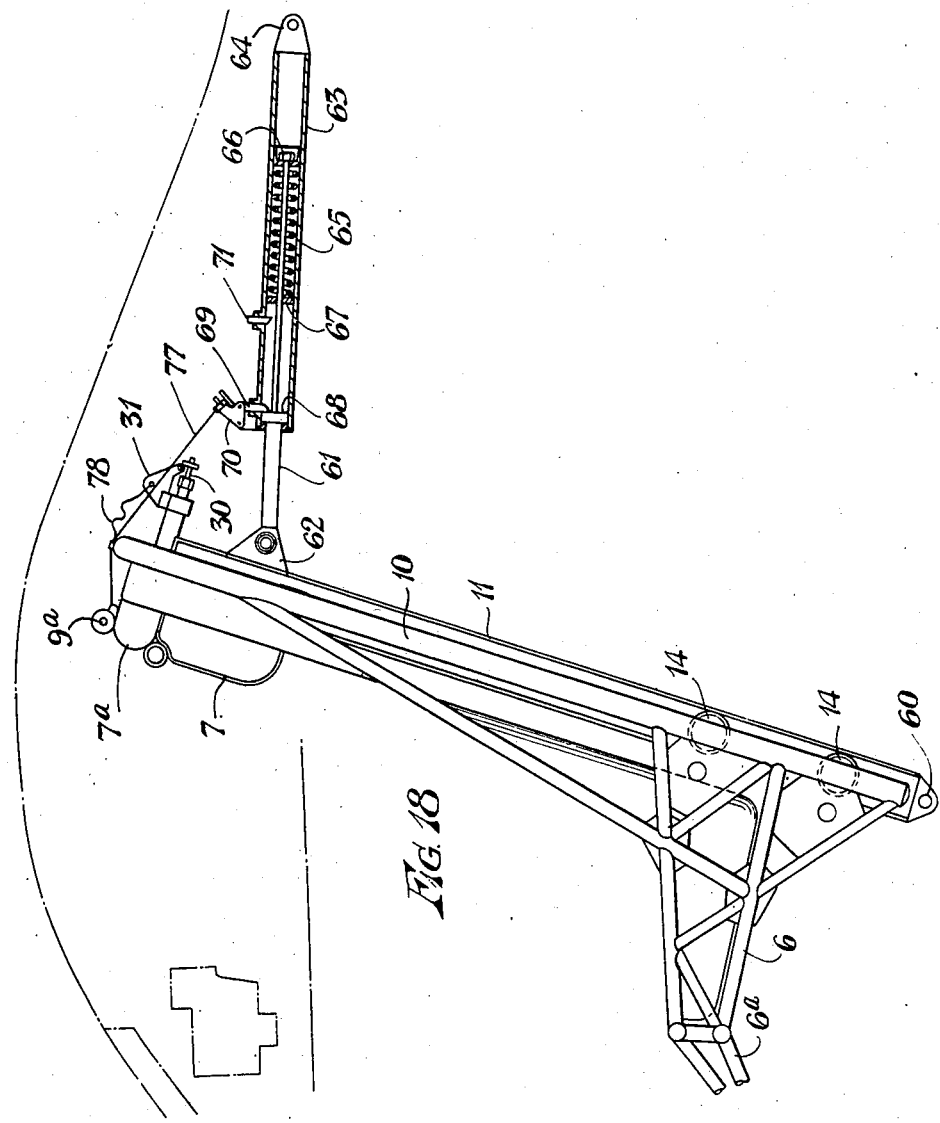

April 19, 1949.  J. MARTIN  2,467,763
LAUNCHING MEANS FOR AIRPLANE SEATS
Filed Jan. 3, 1946.  11 Sheets-Sheet 10
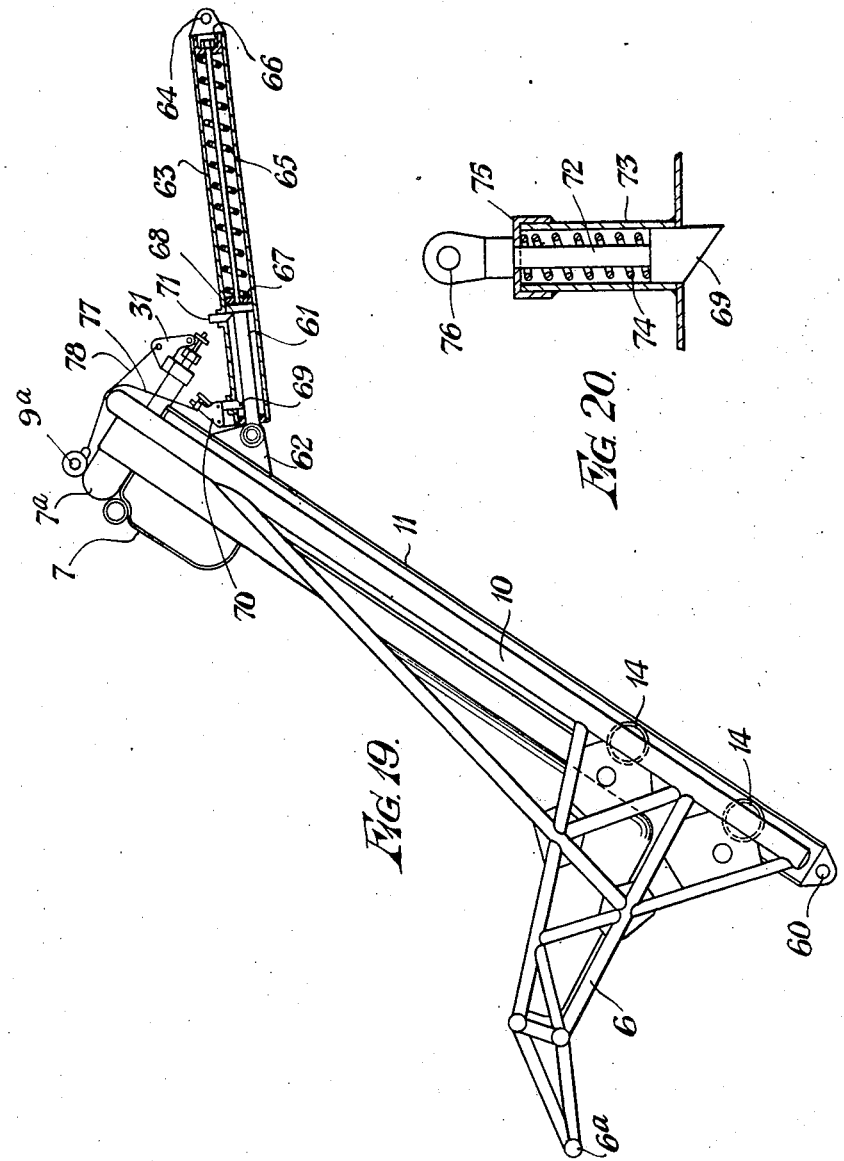
Inventor
JAMES MARTIN.
per Raworth
Attorney.

April 19, 1949.　　　J. MARTIN　　　2,467,763
LAUNCHING MEANS FOR AIRPLANE SEATS
Filed Jan. 3, 1946　　　11 Sheets-Sheet 11
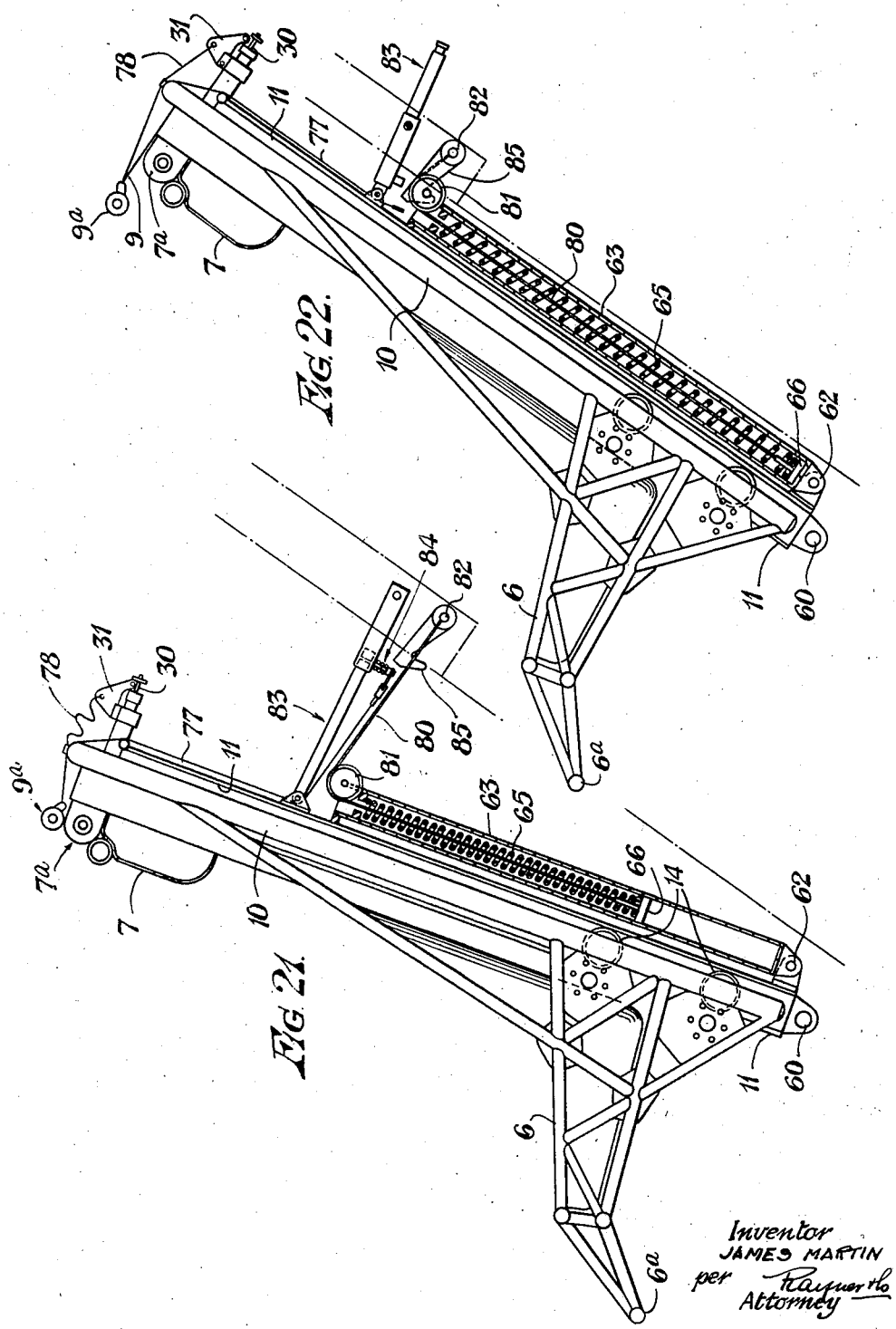

Patented Apr. 19, 1949

2,467,763

UNITED STATES PATENT OFFICE 2,467,763

LAUNCHING MEANS FOR AIRPLANE SEATS

James Martin, Higher Denham, near Uxbridge, England

Application January 3, 1946, Serial No. 638,762
In Great Britain February 28, 1945

15 Claims. (Cl. 244—122)

This invention relates to the making of a parachute escape drop from an aeroplane in flight. Such escape drops by parachute are usually the result of some emergency and may take place whilst the aeroplane is travelling at a very high speed, as for example when the aeroplane is in an uncontrolled dive or in a spin or otherwise acting erratically. In such circumstances the occupant endeavouring to leave the aeroplane will be subjected to very great air pressure against which he will be almost powerless. As a result there is considerable danger that he may be unable to get out of the cockpit or his harness or parachute may get caught up on some part of the aeroplane or he may be flung against and strike some part of the tailplane, rudder or fin or other part of the aeroplane, whereby he may be killed or incapacitated from taking the necessary action required to make a successful drop by parachute. The object of this invention is to enable the pilot or other occupant to be launched from the cockpit or escape hatch in a controlled and orderly manner so as to avoid the risk of striking against or being caught-up on any part of the aeroplane. The invention also includes safeguards to protect the occupant against the effects of the air pressure and rapid acceleration to which he may be subjected.

The invention is particularly applicable to single seater high speed fighter aeroplanes and the occupant will therefore be referred to hereinafter as the pilot but it is to be understood that the invention is also applicable to larger aeroplanes having more than one occupant and the term "pilot" where appropriate may be deemed to include navigator, gunner, observer, passenger or any other occupant of the aeroplane. The invention may also be applied to the launching of packages or supplies or even bombs or explosives.

According to this invention a seat or platform for launching from an aeroplane is mounted on guides directed through the opening of a cockpit or escape hatch and is launched through the said opening by compressed gases obtained from an explosive charge adapted to be fired from within the aeroplane or from any other suitable source.

In the preferred arrangement for launching the pilot or other occupant from the aeroplane, the pilot's seat is slidably mounted on guides directed in an upward but rearwardly inclined direction toward the cockpit opening. A co-operating cylinder and ram carried by the seat and its guides are provided with a breech to receive an explosive cartridge adapted to discharge its gases under pressure into the space between them so as to impel the seat along the guides and to eject it with its occupant through the cockpit opening with sufficient velocity to carry the pilot and seat well away from the aeroplane in spite of the pressure of the slipstream which will be met as soon as they leave the cockpit. A protector for the pilot's head and face may be arranged so that the act of bringing it into position will also locate the pilot's head and hands in a safe position and will actuate the mechanism for firing the explosive charge. Foot rests are provided at the front of the seat on each side thereof to receive the pilot's feet and serve to locate his legs in a safe and compactly folded position which acts to counteract and protect the pilot against the high G produced by the rapid upward acceleration and also against the pressure of the slipstream. The compact folding of the pilot's legs against his body also serves to reduce the area exposed to the slip stream and thus reduces the tendency for the pilot to be swept backwardly toward the tail of the aeroplane. The protector over the pilot's face protects his eyes against damage by the force of the slipstream, holds his head against the head rest and also avoids the risk of his lungs being inflated by the air pressure. Although it is preferred to obtain the required gases under pressure from the firing of an explosive charge, it is to be understood that compressed gases from a metal capsule or other reservoir are also included within the scope of the invention.

In order that the invention may be more readily understood suitable examples of construction and arrangement of the invention will now be described with reference to the accompanying drawings in which:

Figs. 1 to 6 are diagrammatic sketches illustrating the various stages in the launching of the pilot and his seat from the cockpit of a high speed fighter aeroplane.

Fig. 8 is a rear perspective of the pilot's seat and guide frame.

Fig. 8A is a detail of the head protector.

Fig. 9 is a broken sectional elevation through the piston and cylinder including the expansion chamber and firing mechanism.

Fig. 9A is a section through a supplementary cartridge and its chamber.

Fig. 10 is a broken perspective view illustrating one method of incorporating the usual seat adjusting mechanism.

Fig. 10A is a detail of an emergency release device for the seat adjusting lever.

Figs. 11 and 12 are rear and side elevation of a modified construction of seat and guide frame.

Figs. 13 and 14 are fragmentary plan and a detail of the cylinder housing and guide block respectively.

Figs. 15, 16 and 17 show side elevation, plan and rear elevation of a separate chassis with the guide wheels for fitting to the seat.

Figs. 18, 19 and 20 show details of a method of increasing the angle of the seat guide at the moment of ejection so as to obtain greater clearance for the pilot's legs, and Figs. 21 and 22 show a modified seat tilting device.

Figure 7:
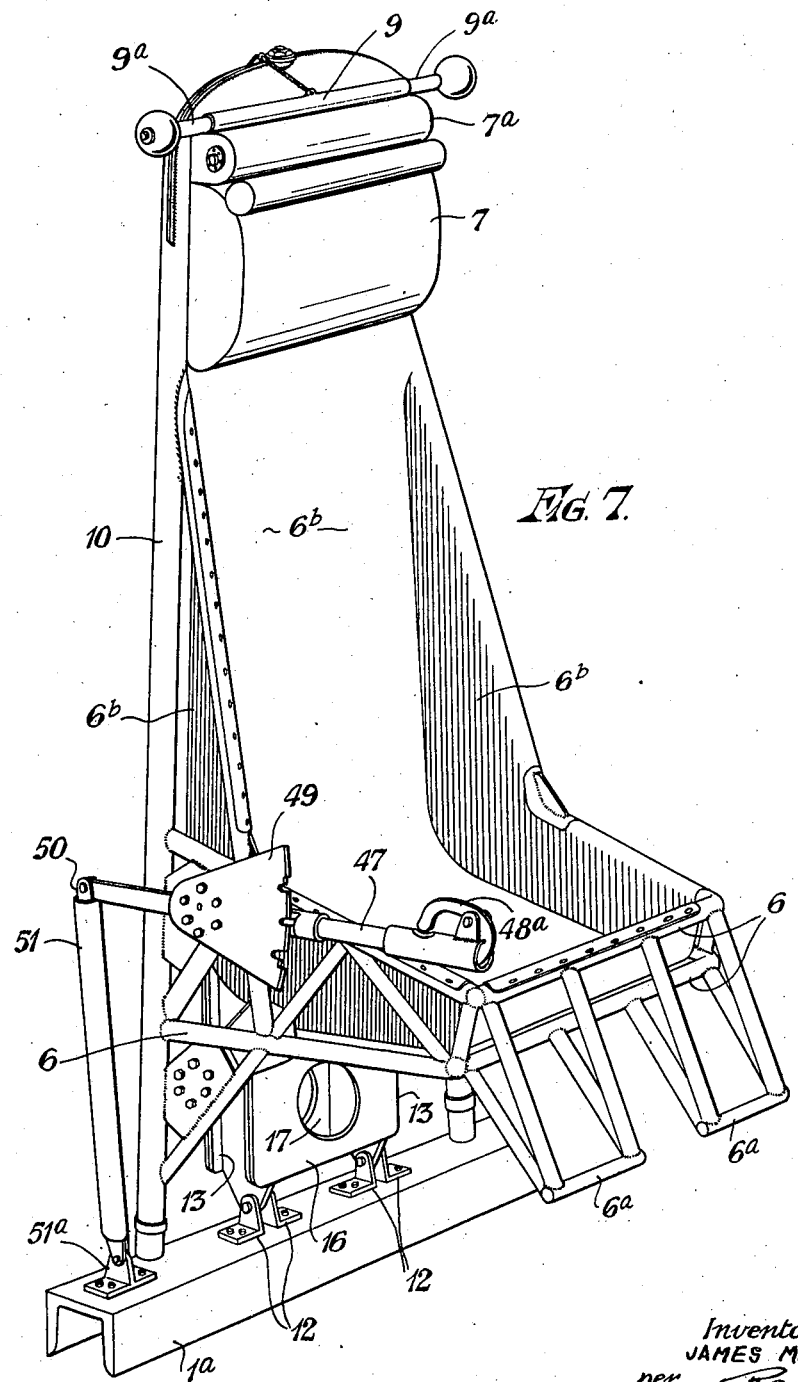
Fig. 7 is a front perspective view of a pilot's seat according to the invention.

Referring to Figs. 1 to 6 of the drawings, these illustrate diagrammatically the various stages in the launching of the pilot from the cockpit of a fighter type of aeroplane. In these diagrams a portion of the fuselage is indicated by the numeral 1 and the pilot is seated in the cockpit opening 2 behind the windscreen 3 and in Fig. 1 the cockpit opening is covered by the transparent slidable hood 4 which is mounted so that it may be quickly jettisoned when the pilot wishes to make an emergency escape from the aeroplane. The pilot is seated on the cushion 5 of his tubular frame seat 6 in the normal flying attitude and with his head resting against the padded head rest 7. The seat is slidably mounted in upwardly directed but rearwardly inclined guides 8 and the launching mechanism is controlled by the protective blind 9 for covering the pilot's face. In Fig. 2 the hood 4 has been jettisoned and the pilot's feet are raised and placed in the stirrup-like rests 6a at the front of the seat 6 and both hands are grasping the handle 9a of the blind 9. In Fig. 3 the pilot has pulled the blind 9 down so as to cover and protect his face. This actuates the launching mechanism so that the seat, with the pilot, is propelled in an upward direction from the cockpit opening as shown in Fig. 4. In Fig. 5 the pilot and his seat 6 are right out of the cockpit and clear of the seat guides 8. Fig. 6 shows in front elevation the compact arrangement of the pilot's body with his feet raised and supported on the foot rests 6a and the feet and knees separated so that the control stick of the aeroplane will pass freely between them. The pilot's arms are also held close into the body grasping the handle 9a of the blind 9 which is drawn down to protect the pilot's face and to hold his head firmly against the padded head rest 7.

In Figs. 7 and 8 the pilot's seat 6 is of light weight welded tubular construction and supports shaped sheet metal lining panels 6b riveted or otherwise secured to the tubular frame which is in turn supported by a strong inverted U-shaped tubular back frame 10. This back frame is open at its lower end and fits over and receives a fixed guide frame 11 mounted within the cockpit and secured to a suitable strong fixed part of the aeroplane fuselage by means of brackets 12 secured at its lower end. The guide frame is provided with guide channels 13 in each edge, with which engage rollers 14 supported on brackets 15 on the back frame 10 of the seat and directed inwardly therefrom. In Fig. 7 the guide frame is built up of the pair of outwardly directed side channels 13 of light metal alloy connected together and covered by front and rear panels 16 and 17 of light sheet metal alloy riveted to the flanges of the channel members. The space between the two channels 13 and the front and rear panels 16 and 17 forms a through passage in the guide frame. The guide frame 11 is preferably located in the same plane as the U-shaped tubular back frame 10 so as to minimise bending stresses on the latter. In Fig. 8 the guide 11a is of solid construction with the channels 13 machined in each side thereof. A single lug 18 is secured between the brackets 12.

Within the through passage in the fixed guide frame is located the impeller unit 20 for expelling the seat 6 and pilot from the aeroplane when required. The impeller unit comprises a cylinder 21 and a ram or piston 22 telescoping together, one being pivotally anchored to the underside of the arch of the U-shaped back frame 10 and the other being anchored to a pivot pin supported between laminated lugs secured to the front and back plates 16 and 17 of the guide frame 11.

In the arrangement illustrated in Fig. 9 and Fig. 9A an inverted cylinder 21 is anchored at its lower end and the hollow ram 22 fits in the cylinder so that they may slide relatively to each other. At the head of the hollow ram is fitted the end plug 23 with lugs 23a for anchoring it to the arch of the seat back frame 10. A cap 24 is fitted to the lower end of the cylinder 21 and has an end plug 24a for anchoring it to the fixed guide frame or other fixed part of the aeroplane. The hollow ram 22 has a tubular piston head 25 fitted in its lower end and piston rings 26 on the tubular piston head make a gas tight fit with the cylinder 21. In this manner the whole of the interior of the cylinder and hollow ram may act as an expansion chamber 27 for the gases from the explosive charge in the firing chamber 28 in the end plug 23 of the hollow ram 22.

The firing chamber 28 is fitted with a breech block 29 with spring loaded firing pin 30. A trigger lever 31 is pivoted at 32 to the flange 33. The trigger lever is provided with a roller 34 which engages behind the recessed flange 35 secured on the outer end of the firing pin 30 when this is drawn back to cock the firing mechanism. An aperture 36 is provided in the upper corner of the trigger lever 31 for attaching the end of a ligature so that a firm pull on it will actuate the trigger and release the firing pin 30. In the arrangement already described the ligature is coupled with the blind 9 so that a cartridge in the firing chamber 28 will be fired when the blind is pulled into position over the pilot's face. The trigger lever 31 may engage with one of a series of notches in the edge of a locking ring 37 screwed around the end of a plug 38 fitted in the end of the breech block 29 to locate the firing pin and its spring therein. This prevents the locking ring from working loose. A removable screw threaded plug 39 is provided opposite the opening 40 from the firing chamber 28 in which may be fitted a removable disc having a number of small perforations and this gives access for cleaning or for removing a cartridge or spent cartridge case.

One or more tubular bands 41 are fitted round the cylinder 21 at intervals in its length and are welded or otherwise secured to make a gas tight joint. Each band 41 has a supplementary firing chamber 42 to receive a supplementary cartridge 43. Fig. 9A shows a supplementary chamber and cartridge in detail. The chamber 42 receives a cartridge 43 secured by the screw cap 44. The cartridge has a readily ignitable explosive charge retained by a cover disc 45 in its open end and this disc may be perforated or may be of inflammable material such as Celluloid. Small perforations 46 in the wall of the cylinder 21 communicate with the supplementary firing chamber.

Owing to the relatively large volume of the expansion chamber 27, the initial pressure and acceleration of the parts will be kept low. As the ram and cylinder move apart perforations 46 leading to the supplementary firing chambers will be successively uncovered and the burning gases will fire the charge of each supplementary cartridge in turn and they will discharge their gases into the expansion chamber 27. The number of the supplementary cartridges and the amount of their charge may be regulated so as to obtain control over the pressure and acceleration throughout the operation of expelling the seat and its occupant. In this way the pressure and consequently the acceleration may be kept at a relatively low but constant average. This will also keep down the G to which the pilot is subjected to a constant low average instead of a high initial value gradually falling off. It may however be regulated to give a low initial value with a slight gradual increase throughout the operation so as to maintain a moderate average without harmful effect on the pilot or other occupant of the seat.

The firing control mechanism is operated by the pilot and the preferred arrangement consists in operating the firing control in conjunction with the protective screen 9 for the pilot's face so that when the pilot brings this screen into position this final act will fire the cartridge or may both cock the firing mechanism and fire the cartridge. The protective face screen may be of a rigid, semi-rigid or flexible nature and is intended to prevent damage to the pilot's eyes or inflation of his lungs by the air pressure as he leaves the cokpit. It also holds his head firmly against the padded head rest. It is preferred to make the screen of a flexible nature and the material may be semi-pervious such as canvas so that a limited amount of air may pass through it. If desired, however, the material may be impervious and may also be transparent or may have transparent sections. In the arrangement illustrated in Figs. 7, 8 and 8A, the screen comprises a blind 9 of strong canvas rolled on a spring roller 9b carried by the upper end of the seat back 10 and located above the pilot's head rest 7 in the housing 7a. A handle 9a is provided and its ends extend beyond the width of the canvas screen connected thereto. The canvas screen is automatically rolled up on the spring roller 9b and a ligature is connected from the screen or the handle to the trigger 31 or release mechanism of the firing pin 30. When the pilot is all ready to leave the aeroplane he pulls the screen 9 over his face and at the same time the pull on the ligature will pull the trigger 31 and release the firing pin 30 and fire the cartridge. The handle 9a for the blind is shaped so as to enable both hands to grasp the handle so that they will be safely positioned to avoid damage or injury during the exit from the aeroplane.

In practice, when the pilot has decided that it is necessary to leave his aeroplane by parachute, he would jettison the cockpit hood 4 in the normal way. He then lifts his legs from the rudder bar and places his feet in the stirrup-like foot rests 6a provided at each side of the seat 6. This will double up his legs compactly against his body and will tend to separate his knees so that the control stick will pass freely between them. The pilot then puts up his hands and grasps the handle 9a of the protective blind 9 which is above his head. He then pulls this down firmly so as to draw the screen over his face which at the same time fires the cartridge which acts to expel the pilot and his seat from the aeroplane. The pilot's head, arms and legs will automatically be positioned so as to avoid risk of injury during the exit from the aeroplane. The pilot will be protected against the effect of the sudden acceleration, the intestines will be stabilised and a rush of blood from the head will be avoided. The face screen also prevents damage to the pilot's eyes and inflation of his lungs by air pressure when he meets the slipstream. The compact arrangement of the limbs also presents a relatively small area to the air pressure so that the rate of movement rearwardly relatively to the aeroplane will be kept down and the pilot will clear the tailplane fin and other parts of the aeroplane with a substantial margin of safety.

The pilot of course wears his usual harness which is anchored to the seat in the normal way. When the pilot and his seat have got well clear of the aeroplane, a length of cable which may be housed in a container and connected to the seat and the aeroplane, will when fully extended operate a catch which frees the anchorage of the pilot's harness to the seat so that the seat will fall away from the pilot who will now be free to use his parachute in the normal way. If desired, the seat may be connected to the parachute control, so that when the seat falls away, the parachute control will be automatically operated thus relieving the pilot of the need to take this action. If desired the parachute may be folded and packed on the back of the seat and the seat may be connected thereto and supported by the parachute when launched. The pilot or other occupant may remain in the seat and land in it. When intended to be used in this way side tubes or frame members may extend upwardly from the foot rests to the seat back to form forwardly projecting side members which will protect the pilot when landing.

In case the pilot should forget to disconnect his headphone and oxygen and such like connections, these are preferably brought together in a single coupling or guillotine block mounted on the seat back or the guide frame and a suitable cutter provided so that relative movement between these two parts when the seat is expelled would at once sever the connections leaving free the relatively short ends still connected to the pilot.

The normal adjustment for the pilot's seat may be incorporated in order to adapt the seat to the comfort of different pilots. For this purpose an adjustment for height may be incorporated in the connection between the seat and the tubular seat back or between the guide frame and its mounting on the fuselage. In another arrangement adjustable limiting stops may be provided in the channel guides at the edges of the guide frame. In all cases a suitable hand control lever is provided at the side of the seat, so that the pilot may make the necessary adjustment when seated in the seat. One suitable arrangement is illustrated in Figs. 10 and 10A in which the side tubes 10 of the seat are provided with spring loaded telescopic ends 10a which engage with a strong channel section cross member 1a which is suitably shaped and built into the fuselage of the aeroplane and to which the fixed guide 11a is anchored by the brackets 12. The springs in the telescopic ends 10a of the side tubes 10 are strong enough to support a large proportion of the weight of the seat and its occupant. The seat may thus be raised or lowered on its guides in the fixed guide by means of the seat adjusting hand lever 47 pivoted at 47a to the seat frame 6 and having a spring loaded locking catch 48 to engage with any of a series of notches in the fixed quadrant 49 and adapted to be released by the small hand grip lever 48a. The tail end of the seat adjusting hand lever 47 is pivoted to a releasable fork end 50 of the tubular link 51 pivoted at its other end to a bracket 51a on the channel member 1a. The occupant of the seat may adjust its height by gripping the hand lever 47 and the small hand grip lever 48a and moving the lever 47 up or down to engage the catch 48 in one or other of the notches in the quadrant 49. When the seat is to be expelled from the aeroplane the act of firing the cartridge is arranged to also release the fork end 50 from the tubular link 51. For this purpose a ligature or flexible cable 52 connects the blind 9 or its handle or other firing control means to the locking plate 53 so that the act of operating the firing control will withdraw the locking plate from the spring loaded plunger 51b the inner end of which engages in the groove 50a in the fork end 50 to retain it in the tubular link 51. When the locking plate is pulled away, the spring will withdraw the plunger 51b and the seat will be free to be expelled from the aeroplane. Fig. 10A shows in detail the releasable fork end 50 and the means for securing and releasing it from the end of the tubular link 51.

In Figs. 11, 12, 13 and 14 the seat back 10 comprises the two side tubes connected by a built up arch at their upper ends. This arch comprises a shaped back and front pressed sheet metal member 54 welded on each side of a central web 54a and formed with sockets 54b at each end to receive the ends of the side tubes 10. This enables the top arch of the seat back to be of great strength and of fairly sharp curvature. Cross rails 55 are enclosed by sheet metal covers 55a to form supports for the guide wheels 14 mounted in suitable bearings. These wheels 14 face inwardly and engage in the recessed channels 13 of the fixed guide member 11a which is anchored to the frame of the aeroplane at its lower end. The cylinder 21 and the ram or piston 22 of the impeller unit are located in the hollow bore of the fixed guide member 11a. This arrangement enables the guide channels 13 to be accurately machined in the rigid guide member 11a.

Figs. 15, 16 and 17 illustrate a method of mounting the guide rollers on a chassis adapted to be produced as a separate unit which can be accurately constructed and machined and is subsequently fitted into the seat structure. By this means correct alignment and positioning of the guide rollers can be achieved. For this purpose the guide rollers 14 are mounted one on each of four rearwardly projecting brackets 15 on a rectangular chassis frame bolted at its four corners to plates 56 welded or otherwise secured to the tubular side members of the seat 6. The chassis frame may be made from a light casting or forging of magnesium or other suitable alloy or may be built of light sheet metal welded or otherwise suitably joined where required. In the example shown in Figs. 15, 16 and 17 the chassis comprises upper and lower transverse tubes 57 on which are welded or otherwise secured the brackets 15 with the rearwardly projecting bosses 15a. The upper and lower brackets 15 are connected together by flanged stiffening plates 58 and the tubes 57 have flanged ends 59 for securely bolting them to the plates 56 on the seat frame 6. The chassis may be mounted in a suitable jig and subsequently bored or reamed so that the sockets in the bosses 15a will be accurately aligned and parallel to each other. Suitable shafts with bearings for the rollers 14 are fitted in these sockets.

In some aeroplanes and especially those fitted with reflector sights or other somewhat bulky instruments located just in front of the pilot, there would be relatively little clearance between the pilot's feet and legs and these instruments or the instrument board or windscreen of the aeroplane or other accessories. In such cases it is desirable to be able to increase the clearance at the time when the pilot is being launched from the cockpit. An arrangement for achieving this is shown in Figs. 18, 19 and 20 in which the guide frame 11 is mounted to hinge about a hinge pin 60 at its lower end and is adjustably supported at its upper end by a spring loaded ram 61 the end of which is pivoted to a bracket 62 on the guide frame 11 near its upper end. The ram 61 slides in a tubular housing 63 which is anchored at its far end 64 to a fixed part of the aeroplane fuselage. A coil spring 65 surrounds the ram. In the normal flying position of the seat 6 as shown in Fig. 18 the spring 65 is compressed between a piston 66 secured on the end of the ram and slidable in the tubular housing 63 and a fixed collar 67 in the housing. The ram has a further collar 68 which is engaged by a latch 69 to lock it in position. This latch 69 is connected to a pivoted lever 70 and to the roller blind 9 or its handle 9a. A further latch 71 is provided to secure the ram in the retracted position shown in Fig. 19. A suitable construction for these latches 69 and 71 is shown in Fig. 20. Each latch is mounted on a spindle 72 in a guide 73 containing a spring 74 located by a cap 75. The spindle is fitted with an eye or handle 76 by which it may be actuated. The lower edge of each latch is rounded to allow the collar 68 to snap past them. A ligature 77 connects the pivoted lever 70 of the latch 69 to the blind 9 or its handle 9a and the ligature 78 connects the trigger 31 of the firing pin 30 to the blind 9 or its handle 9a.

In normal flying conditions the seat 6 and the guide 11 are held in the position shown in Fig. 18 by the ram 61 locked by the latch 69. When the pilot is about to make a parachute escape and has carried out the necessary preliminaries, he pulls the blind 9 over his face. The first result is to pull on the ligature thus withdrawing the latch 69 by its lever 70 and releasing the ram 61. The compressed spring 65 retracts the ram 61 into its housing 63 and pulls back the upper end of guide 11 which is thus further inclined rearwardly as shown in Fig. 19. The latch 71 engages the collar 68 and holds the guide at the increased rearward inclination. Further pulling down of the blind will actuate the trigger 31 to release the firing pin 30 and fire the cartridge to propel the seat and the pilot along the guide 11 and out from the cockpit. By tilting the guide 11 and the seat 6 additional clearance is provided to ensure the pilot's safe launching through the cockpit opening. In Figs. 21 and 22 the spring 65 in its housing 63 is arranged parallel to the back of the seat and a cable 80 secured to the piston 66 passes round the pulley 81 and is anchored to a fixed part of the aeroplane at 82. The seat guide 11 is normally held in the position shown in Fig. 21 by the telescopic stay 83 locked by a spring loaded plunger 84 similar to Fig. 10A. When this is released by the ligature 77, the guide 11 and seat 6 are pulled back as in Fig. 22 and are retained by the latch 85 which engages in the end of the spring housing 63.

I claim:

1. An airplane pilot launching means comprising a seat, guide rails upon which said seat is slidably mounted, said guide rails being permanently fixed in an airplane cockpit and directed toward the opening thereof, a fluid-actuated impeller unit, said impeller unit being comprised of two elements, a cylinder element and a ram element slidably mounted within said cylinder element, one of said elements being connected to said seat and the other of said elements being connected to said guide rails, a firing chamber for an explosive cartridge arranged and positioned to discharge the gases evolved upon explosion of said cartridge into the expansion chamber formed by the relative juxtaposition of the said impeller unit elements, and a protective face shield operably disposed above said airplane seat and arranged and positioned to cover protectively the face of the occupant of said seat before and after the launching of said seat and occupant from said cockpit.

2. An airplane pilot launching means comprising a seat, guide rails upon which said seat is slidably mounted, said guide rails being permanently fixed in an airplane cockpit and directed toward the opening thereof, a fluid-actuated impeller unit, said impeller unit being comprised of two elements, a cylinder element and a ram element slidably mounted within said cylinder element, one of said elements being connected to said seat and the other of said elements being connected to said guide rails, a firing chamber for an explosive cartridge arranged and positioned to discharge the gases evolved upon explosion of said cartridge into the expansion chamber formed by the relative juxtaposition of the said impeller unit elements, at least one supplementary firing chamber containing at least one explosive charge, arranged and positioned to actuate in turn said impeller unit, whereby when said impeller unit is actuated the seat is launched from said cockpit, and a protective face shield operably disposed above said airplane seat and arranged and positioned to cover protectively the face of the occupant of said seat before and after the launching of said seat and occupant from said cockpit.

3. An airplane pilot launching means comprising a seat, guide rails upon which said seat is slidably mounted, said guide rails being permanently fixed in an airplane cockpit and directed toward the opening thereof, a fluid-actuated impeller unit, said impeller unit being comprised of two elements, a cylinder element and a ram element slidably mounted within said cylinder element, one of said elements being connected to said seat and the other of said elements being connected to said guide rails, a firing chamber for an explosive cartridge arranged and positioned to discharge the gases evolved upon explosion of said cartridge into the expansion chamber formed by the relative juxtaposition of the said impeller unit elements, a firing mechanism operably disposed relative to the airplane seat and arranged and positioned to detonate said explosive cartridge when said firing mechanism is actuated by the occupant of said seat, and a protective face shield operably disposed above said airplane seat, arranged and positioned to actuate said firing mechanism and to cover protectively the face of the occupant of said seat before and after the launching of said seat and occupant from said cockpit.

4. An airplane pilot launching means comprising a seat, guide rails upon which said seat is slidably mounted, said guide rails being permanently fixed in an airplane cockpit and directed toward the opening thereof, a fluid-actuated impeller unit, said impeller unit being comprised of two elements, a cylinder element and a ram element slidably mounted within said cylinder element, one of said elements being connected to said seat and the other of said elements being connected to said guide rails, a firing chamber for an explosive cartridge arranged and positioned to discharge the gases evolved upon explosion of said cartridge into the expansion chamber formed by the relative juxtaposition of the said impeller unit elements, at least one supplementary firing chamber containing at least one explosive charge, arranged and positioned to actuate in turn said impeller unit, whereby when said impeller unit is actuated the seat is launched from said cockpit, and a protective face shield operably disposed above said airplane seat, arranged and positioned to actuate said firing mechanism and to cover protectively the face of the occupant of said seat before and after the launching of said seat and occupant from said cockpit.

5. An airplane seat launching means comprising a seat, an arch shaped back permanently fixed to said seat and comprising an integral part thereof, rollers permanently fixed to said arch shaped back, a channel section guide within said arch shaped back upon which said rollers are movably mounted, said channel section guide being permanently fixed in an airplane cockpit and directed toward the opening thereof, a fluid-actuated impeller unit connected to said arch shaped back and to said channel section guide, and means for supplying fluid pressure to actuate said impeller unit, said means comprising at least one firing chamber, containing at least one explosive charge, arranged and positioned to actuate said impeller unit, whereby when said impeller unit is actuated the seat and arch shaped back integrally a part thereof is launched from said cockpit.

6. An airplane seat launching means comprising a seat, an arch shaped back permanently fixed to said seat and comprising an integral part thereof, rollers permanently fixed to said arch shaped back, a channel section guide within said arch shaped back upon which said rollers are movably mounted, said channel section guide being permanently fixed in an airplane cockpit and directed toward the opening thereof, a fluid-actuated impeller unit, said impeller unit being comprised of two elements, a cylinder element and a ram element slidably mounted within said cylinder element, one of said elements being connected to said arch shaped back and the other of said elements being connected to said channel section guide, a firing chamber for an explosive cartridge located in a plug at the end of one of said elements, said firing chamber being arranged and positioned to discharge the gases evolved upon explosion of said cartridge into the expansion chamber formed by the relative juxtaposition of the said impeller unit elements, and a firing mechanism operably disposed relative to the airplane seat and arranged and positioned to detonate said explosive cartridge when said firing mechanism is actuated by the occupant of said seat.

7. An airplane seat launching means comprising a seat, an arch shaped back permanently fixed to said seat and comprising an integral part thereof, rollers permanently fixed to said arch shaped back, a channel section guide within said arch shaped back upon which said rollers are movably mounted, said channel section guide being permanently fixed in an airplane cockpit and directed toward the opening thereof, a fluid-actuated impeller unit, said impeller unit being comprised of two elements, a cylinder element and a ram element slidably mounted within said cylinder element, one of said elements being connected to said arch shaped back and the other of said elements being connected to said channel section guide, a firing chamber for an explosive cartridge located in a plug at the end of one of said elements, said firing chamber being arranged and positioned to discharge the gases evolved upon explosion of said cartridge into the expansion chamber formed by the relative juxtaposition of the said impeller unit elements, more than one supplementary firing chamber disposed along the length of the cylinder element of said impeller unit, said supplementary firing chambers being provided with mutually communicating apertures between each supplementary firing chamber and the interior of the cylinder element, whereby hot gases evolved upon cartridge detonation ignite explosive cartridges in supplementary firing chambers consecutively and are discharged therefrom into the said expansion chamber.

8. An airplane seat launching means comprising a seat, an arch shaped back permanently fixed to said seat and comprising an integral part thereof, rollers permanently fixed to said arch shaped back, a channel section guide within said arch shaped back upon which said rollers are movably mounted, said channel section guide being permanently fixed in an airplane cockpit and directed toward the opening thereof, a fluid-actuated impeller unit connected to said arch shaped back and to said channel section guide, and means for supplying fluid pressure to actuate said impeller unit, said means comprising at least one firing chamber, containing at least one explosive charge, arranged and positioned to actuate said impeller unit, whereby when said impeller unit is actuated the seat and arch shaped back integrally a part thereof is launched from said cockpit, and a firing mechanism comprising a spring loaded firing pin mounted in a breech block in the breech end of a firing chamber for the main explosive cartridge and adapted to be cocked and released by a trigger.

9. An airplane seat launching means according to claim 8 wherein the integral seat and arch shaped back is further comprised of a protective face shield permanently fixed to said arch shaped back, arranged and positioned to release the firing pin and thereby to actuate the firing mechanism of said airplane launching means when drawn to cover protectively the face of the occupant of said seat.

10. An airplane seat launching means according to claim 8 wherein the airplane cockpit is provided with foot rests arranged and positioned one at each side of the front of the integral seat and arch shaped back to ensure a safely folded posture of the occupant of said seat during and after the launching of said seat and occupant from said cockpit.

11. An airplane seat launching means comprising a seat, an arch shaped back permanently fixed to said seat and comprising an integral part thereof, a roller chassis unit separately mounted upon said arch shaped back, a channel section guide within said arch shaped back upon which said rollers are movably mounted, said channel section guide being permanently fixed in an airplane cockpit and directed toward the opening thereof, a fluid-actuated impeller unit connected to said arch shaped back and to said channel section guide, and means for supplying fluid pressure to actuate said impeller unit, said means comprising at least one firing chamber, containing at least one explosive charge, arranged and positioned to actuate said impeller unit, whereby when said impeller unit is actuated the seat and arch shaped back integrally a part thereof is launched from said cockpit.

12. An airplane seat launching means comprising a seat, an arch shaped back permanently fixed to said seat and comprising an integral part thereof, rollers permanently fixed to said arch shaped back, a channel section guide within said arch shaped back upon which said rollers are movably mounted, said channel section guide being permanently fixed in an airplane cockpit and directed toward the opening thereof, a fluid-actuated impeller unit, said impeller unit being comprised of two elements, a cylinder element and a ram element slidably mounted within said cylinder element, said ram element being anchored to said arch shaped back and said cylinder element being anchored at the lower extremity to said channel section guide, a firing chamber for an explosive cartridge located in a plug at the end of one of said elements, said firing chamber being arranged and positioned to discharge the gases evolved upon explosion of said cartridge into the expansion chamber formed by the relative juxtaposition of the said impeller unit elements, and a firing mechanism operably disposed relative to the airplane seat and arranged and positioned to detonate said explosive cartridge when said firing mechanism is actuated by the occupant of said seat.

13. An airplane seat launching means comprising a seat, an arch shaped back hingedly and adjustably mounted to said seat and comprising an integral part thereof, rollers permanently fixed to said arch shaped back, a channel section guide within said arch shaped back upon which said rollers are movably mounted, said channel section guide being permanently fixed in an airplane cockpit and directed toward the opening thereof, a fluid-actuated impeller unit, said impeller unit being comprised of two elements, a cylinder element and a ram element slidably mounted within said cylinder element, said ram element being anchored to said arch shaped back and said cylinder element being anchored at the lower extremity to said channel section guide, a firing chamber for an explosive cartridge located in a plug at the end of one of said elements, said firing chamber being arranged and positioned to discharge the gases evolved upon explosion of said cartridge into the expansion chamber formed by the relative juxtaposition of the said impeller unit elements, and a firing mechanism operably disposed relative to the airplane seat and arranged and positioned to detonate said explosive cartridge when said firing mechanism is actuated by the occupant of said seat.

14. An airplane seat launching means comprising a seat, an arch shaped back hingedly and adjustably mounted to said seat and comprising an integral part thereof, a telescopic ram normally locating the upper extremity of said arch shaped back, spring means arranged and positioned to actuate said telescopic ram whereby to alter the rearward inclination of said arch shaped back, locking catches arranged and positioned to maintain said arch shaped back in said normal position, rollers permanently fixed to said arch shaped back, a channel section guide within said arch shaped back upon which said rollers are movably mounted, said channel section guide being permanently fixed in an airplane cockpit and directed toward the opening thereof, a fluid-actuated impeller unit, said impeller unit being comprised of two elements, a cylinder element and a ram element slidably mounted within said cylinder element, said ram element being anchored to said arch shaped back and said cylinder element being anchored at the lower extremity to said channel section guide, a firing chamber for an explosive cartridge located in a plug at the end of one of said elements, said firing chamber being arranged and positioned to discharge the gases evolved upon explosion of said cartridge into the expansion chamber formed by the relative juxtaposition of the said impeller unit elements, means interconnecting said firing chamber and said locking catches, arranged and positioned to release said locking catches upon actuation of said impeller unit, whereby said seat and arch shaped back integrally a part thereof is automatically adjusted and launched from said cockpit at a safe angle of inclination with respect to the cockpit opening and the occupant of said seat.

15. In an airplane seat launching means, the combination of, a seat, guide rails upon which said seat is slidably mounted, said rails being fixed in an airplane cockpit and directed toward the opening thereof, a fluid-actuated impeller unit for said seat, said impeller unit comprising a cylinder having a closed end, a ram slidably mounted within said cylinder, a fluid chamber between the end of the ram and the bottom of the cylinder, a separate firing chamber communicating with said fluid chamber, said firing chamber adapted to contain and discharge a cartridge of explosive material, the gases from said discharge being free to expand into said fluid chamber and force said ram and cylinder apart, one of said latter elements being attached to said seat and the other of said elements being attached to said rails, and a firing mechanism operably disposed relative to said seat and arranged and positioned to detonate said explosive cartridge when said firing mechanism is actuated.

JAMES MARTIN.

REFERENCES CITED

The following references are of record in the file of this patent:

UNITED STATES PATENTS

| Number | Name | Date |
| --- | --- | --- |
| 1,337,336 | Townsley | Apr. 20, 1920 |
| 1,535,475 | Jeansen | Apr. 28, 1925 |
| 2,399,136 | Mount | Apr. 23, 1946 |

FOREIGN PATENTS

| Number | Country | Date |
| --- | --- | --- |
| 179,936 | Switzerland | Mar. 2, 1936 |
| 399,332 | Great Britain | Oct. 5, 1933 |
| 593,583 | France | May 30, 1925 |
| 719,226 | France | Nov. 14, 1931 |